United States Patent
Tseng et al.

(10) Patent No.: US 9,342,973 B2
(45) Date of Patent: May 17, 2016

(54) FALL EVENT HANDLING METHOD AND MOBILE ELECTRONIC DEVICE USING THE SAME

(71) Applicant: HTC Corporation, Taoyuan County (TW)

(72) Inventors: Chuan-Yu Tseng, Taoyuan County (TW); Chun-Hung Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 78 days.

(21) Appl. No.: 14/267,936

(22) Filed: May 2, 2014

(65) Prior Publication Data
US 2015/0317893 A1 Nov. 5, 2015

(51) Int. Cl.
*G08B 21/00* (2006.01)
*G08B 21/18* (2006.01)
*H04W 4/14* (2009.01)

(52) U.S. Cl.
CPC . *G08B 21/18* (2013.01); *H04W 4/14* (2013.01)

(58) Field of Classification Search
CPC . A61B 5/1117; G08B 21/0438; G08B 21/043
USPC ........ 340/686.1, 691.6, 573.1, 539.11, 815.4, 340/384.1; 455/404.2, 456.1
See application file for complete search history.

(56) References Cited

U.S. PATENT DOCUMENTS

| 8,217,790 | B2 | 7/2012 | Script | |
|---|---|---|---|---|
| 8,325,053 | B2 | 12/2012 | Flynt et al. | |
| 2006/0236761 | A1* | 10/2006 | Inoue | G01P 3/22 73/510 |
| 2010/0285771 | A1* | 11/2010 | Peabody | G08B 25/016 455/404.2 |
| 2014/0338445 | A1* | 11/2014 | Lin | G01P 15/0891 73/382 R |
| 2015/0087332 | A1* | 3/2015 | Pijl | G01S 19/34 455/456.1 |

FOREIGN PATENT DOCUMENTS

TW M400056 3/2011

OTHER PUBLICATIONS

"Office Action of Taiwan Counterpart Application", issued on Oct. 15, 2015, p. 1-p. 4.

* cited by examiner

*Primary Examiner* — Phung Nguyen
(74) *Attorney, Agent, or Firm* — Jianq Chyun IP Office (57) ABSTRACT

The present disclosure proposes a method of handling a fall event for use by a handheld mobile electronic device, and a handheld mobile electronic device using the same method. Accordingly, the handheld mobile electronic device first detects a fall event. In response to the fall event determined to have exceeded a predetermined distance, the device would detect whether the device has moved or has experienced a pressure variation within a time period after the fall event has ended. If the result is negative, the device would activate an alarm and transmit a notification related to the fall event.

20 Claims, 8 Drawing Sheets

FALL EVENT HANDLING METHOD AND MOBILE ELECTRONIC DEVICE USING THE SAME

TECHNICAL FIELD

The present disclosure generally relates to a method of handling a fall event for use by a mobile electronic device, and a mobile electronic device using the same method.

RELATED ART

A portable handheld electronic device such as a smart phone has become multi-purpose as data processing, personal organizing, entertainment, and communication functions are combined into one portable pocket sized computer. The versatility of a smart phone has prompted its users to explore an increasing variety of applications developed by various vendors or independent developers, and at the same time physical attributes such as lightness, slimness, shortness, and smallness have been expected by recent users of a smart phone in order for the smart phone to be portable and pocket sized.

Even though the diminutive nature of recent smart phones has allowed recent smart phones to be lightweight and portable, such attributes may cause smart phones to be more prone to accidents as one could more easily slip out of a person's pocket or bag unintentionally, or worse, the accidental slippage may even elude the person's awareness since the person could hardly feel a difference as recent smart phones do not exert much weight, and a rubbery protective shell over the case of a smart phone would muffle or dampen the sound as the phone drops on the floor.

Consequently, there could be a need for a fall handling mechanism so that even when an unintentional lapse of a portable handheld electronic device would inevitably occur, specific actions would be taken the portable handheld electronic device to cope with such event.

SUMMARY OF THE DISCLOSURE

Accordingly, the present disclosure proposes a method of handling a fall event for use by a mobile electronic device, and a mobile electronic device using the same method. One of the overall concepts involve the mobile electronic device first detects a fall event. In response to the fall event determined to have exceeded a predetermined distance, the device would detect whether the device has moved or has experienced a pressure variation within a time period after the fall event has ended. If the device has not been moved or has not experienced a difference in pressure, the device would activate an alarm and transmit a notification related to the fall event.

Specifically, the steps of the proposed method include at least but not limited to the mobile device determines whether a falling distance of the mobile electronic device exceeds a predetermined distance. The mobile device would activate an alarm and/or transmitting a notification related to the fall event based on a sensor variation of the mobile electronic device after the falling distance of the mobile electronic device is determined to exceed the predetermined distance.

According to one of exemplary embodiments, the condition to trigger the alarm based on the sensor variation would include the mobile device determining whether the sensor variation of the mobile electronic device is greater than a non-zero predetermined variation threshold within a predetermined time period after the falling distance of the mobile electronic device is determined to exceed the predetermined distance. The alarm would be activated after the sensor variation of the mobile electronic device is determined to be not greater than the non-zero predetermined variation threshold within the predetermined time period.

According to one of the exemplary embodiments, the specific distance is at least 0.5 meter.

According to one of the exemplary embodiments, the mobile device would determine whether the sensor variation of the mobile electronic device is greater than the non-zero predetermined variation threshold within the predetermined time period after the falling distance of the mobile electronic device is determined to exceed the predetermined distance by at least determining whether the sensor variation of the mobile electronic device is greater than the non-zero predetermined variation threshold within the predetermined time period after a Z-component movement of the mobile electronic device is determined to exceed a speed threshold.

According to one of the exemplary embodiments, the mobile electronic device would determine whether the sensor variation of the mobile electronic device exceeds the non-zero predetermined variation threshold within the predetermined time period after the falling distance of the mobile electronic device is determined to exceed the predetermined distance by at least determining whether the sensor variation of the mobile electronic device is greater that the non-zero predetermined variation threshold within the predetermined time period when the fall event has ceased.

According to one of the exemplary embodiments, the fall event has ceased when the Z-component movement of the handheld mobile electronic device is zero after the mobile electronic device has fallen beyond the specific distance.

According to one of the exemplary embodiments, the abovementioned predetermined time period is between 25~30 seconds.

According to one of the exemplary embodiments, the falling distance of the handheld mobile electronic device could be measured using one of an accelerometer, a pressure sensor and an altimeter.

According to one of the exemplary embodiments, the alarm could be any one of a sound alarm, a vibration alarm, and a visual alarm.

According to one of the exemplary embodiments, the handheld mobile electronic device would transmit the notification related to the fall event in response to activating the alarm of the handheld mobile device. The notification could be any one of an email notification, an instant message notification, a short message service (SMS) message, a multimedia message service (MMS) message, and a paging message.

The present disclosure also proposes a handheld mobile electronic device which includes at least but not limited to a sensor array/hub and a wireless transmitter for transmitting wireless data, and a processor which is coupled to the sensor array, hub, and the wireless transmitter. The processor is configured for determining whether a falling distance of the mobile electronic device exceeds a predetermined distance and activating an alarm and/or transmitting a notification related to the fall event based on a sensor variation of the mobile electronic device after the falling distance of the mobile electronic device is determined to exceed the predetermined distance.

According to one of the exemplary embodiments, the sensory array of the handheld mobile electronic device would include at least one of a G-sensor, a pressure sensor, and an altimeter. Any one of these sensors could be used to measure events related to falling distance and the subsequent movement of the handheld mobile electronic device.

According to one of the exemplary embodiments, the processor would measure the sensor variation within the predetermined time period using one of the sensors in the sensor array when certain conditions have been met after the handheld mobile electronic device is no longer determined to be falling. The conditions would include the falling distance exceeding the specific distance and a Z-component value of the G-sensor exceeding an acceleration threshold.

According to one of the exemplary embodiments, the processor and the sensor array have determined that the handheld mobile electronic device is no longer falling when the Z-component value of the G-sensor is zero after the handheld mobile electronic device has fallen beyond the specific distance which is at least 0.5 meter.

According to one of the exemplary embodiments, the processor is configured for taking a pressure reading using a pressure sensor of the sensor array or taking a G-sensor reading using the G sensor of the sensor array until the timer reaches the predetermined time period in order to determine whether the sensor variation has exceeded a variation threshold.

According to one of the exemplary embodiments, the processor resets the timer and does not activate the alarm using the output interface when the sensor variation threshold exceeds the predetermined variation threshold within the predetermined time period.

According to one of the exemplary embodiments, the handheld mobile electronic device contains a transmitter and a receiver which would transmit and receive wireless data respectively, and the transmitter would be used for transmitting a notification related to a fall event.

According to one of the exemplary embodiments, the handheld mobile electronic device contains the output interface which is at least one of an oscillator, a LED, and a speaker and would generate as least is one of a sound alarm, a vibration alarm, and a visual alarm.

In order to make the aforementioned and other features and advantages of the disclosure more comprehensible, embodiments accompanying figures are described in detail below.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Reference will now be made in detail to the present embodiments of the disclosure, examples of which are illustrated in the accompanying drawings. Wherever possible, the same reference numbers are used in the drawings and the description to refer to the same or like parts.

As being small and lightweight have allowed recent smart phones to be very portable, such attributes would not be without unintended consequences as a phone may slip out of a person's bag or pocket unnoticed. Consequently, the present disclosure proposes a fall handling mechanism so that a user of the portable handheld electronic device such as a smart phone could be informed of the fall event and the portable handheld electronic device could be retrieved.

Also, individuals carrying such portable handheld electronic device may fall accidentally or become unconscious without others in the vicinity. In such scenario, the individuals who might be injured or unconscious would require immediate medical attention. Also it would helpful for the individual to have others notified of such fall event. Therefore, by triggering an alarm of the portable handheld electronic device which would then deliver a notification related to the fall event to self or others, the injured or the unconscious could be properly attended.

In the disclosure, sensors disposed in a handheld mobile electronic device could be utilized to detect a fall event of the mobile electronic device if such handheld mobile electronic device were to accident slip out of one's possession. Also, as the handheld mobile electronic device is carried by a user, and the movements of the user would changes the output of sensors native to the handheld mobile electronic device. When a fall event is determined to have happened by the assistance of an on board sensor, the handheld mobile electronic device would start a timer to count for a predetermine time period. If an on board sensor of the handheld mobile electronic device does not detect a change in sensor readings before the counting of the timer reaches the predetermined time period, an onboard alarm would be triggered and a notification would be transmitted through the wireless transmitter of the handheld mobile electronic device.

Figure 1:
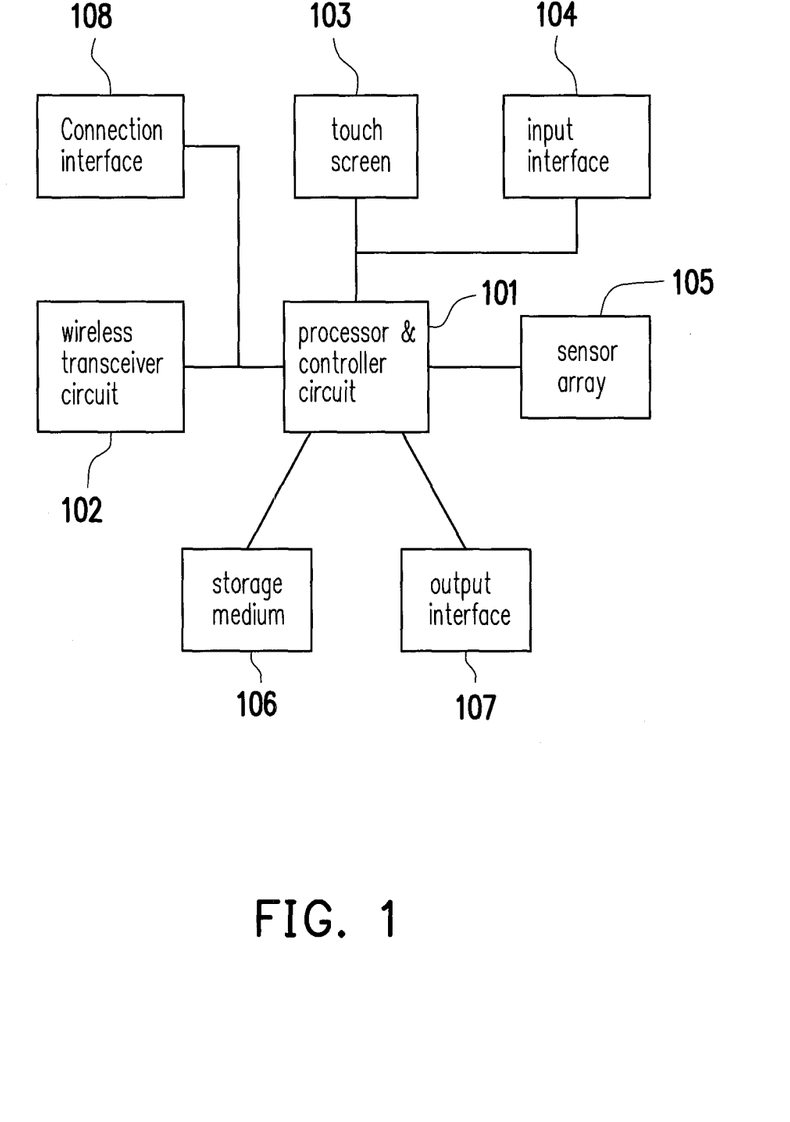
FIG. 1 is a functional block diagram of an exemplary handheld mobile electronic device.

FIG. 1 illustrates the hardware of a handheld mobile electronic device in terms of functional block diagrams in accordance with one of the exemplary embodiments of the present disclosure. An exemplary mobile electronic device could be a smart phone, a mobile phone, a person digital assistant (PDA), a tablet, a notebook computer, and so forth.

The exemplary mobile electronic device of FIG. 1 would include a processor and controller circuit 101. The processor and controller circuit 101 would be electrically coupled to at least but not limited to a wireless transmitter and receiver (transceiver) 102, a touch screen 103, an input unit 104, a sensor array 105, a storage medium 106, and an output interface 107.

The processor and controller circuit 101 may include a micro-controller, a North Bridge, a South Bridge, a field programmable array (FPGA), a programmable logic device (PLD), an application specific integrated circuit (ASIC), or other similar device, or a combination thereof. The processor and controller circuit 101 may also include a central processing unit (CPU) or a programmable general purpose or special purpose microprocessor, a digital signal processor (DSP), a graphics processing unit (GPU), an application specific integrated circuit (ASIC), a programmable logic device (PLD), or other similar device or a combination thereof, which is used for processing all tasks of the exemplary mobile electronic device and would execute functions related to the proposed method of the present disclosure.

The transceiver circuit 102 could be components such as a protocol unit which support signal transmissions of a global system for mobile communication (GSM), a personal handyphone system (PHS), a code division multiple access (CDMA) system, a wireless fidelity (Wi-Fi) system or a worldwide interoperability for microwave access (WiMAX). The transceiver circuit 102 would also provide wireless access for the mobile electronic device 101 by including components at least but not limited to a transmitter circuit, a receiver circuit, an analog-to-digital (A/D) converter, a digital-to-analog (D/A) converter, a low noise amplifier (LNA), mixers, filters, matching networks, transmission lines, a power amplifier (PA), one or more antenna units, and a local storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The touch screen 103 may contain a display such as a liquid crystal display (LCD), a light-emitting diode (LED) display, a field emission display (FED) or other types of display. The input interface 104 could be, for example, an input device such as a mouse, a keyboard, a joystick, a wheel, and so forth and would receive an input operation from a user. The input interface 104 may also include a resistive, a capacitive or other types of touch sensing device which would be integrated as a part of the touch screen 103.

The sensor array 105 may contain various sensors such as a G-sensor, a gyroscope, a motion sensor, a proximity sensor, altimeter, barometer, and so forth.

The connection interface 108 could be, for example, a cable interface such as a universal serial bus (USB) or a wireless interface such as Bluetooth. The connection interface 108 could be a serial interface such as RS232 interface or could be a parallel interface such as USB or Firewire.

The storage medium 106 could volatile or permanent memories which would store buffered or permanent data such as compiled programming codes used to execute functions of the exemplary mobile electronic device.

The output interface 107 would include at least but not limited to a speaker, a vibrating oscillator, and one or more light emitting diodes (LED).

Figure 2:
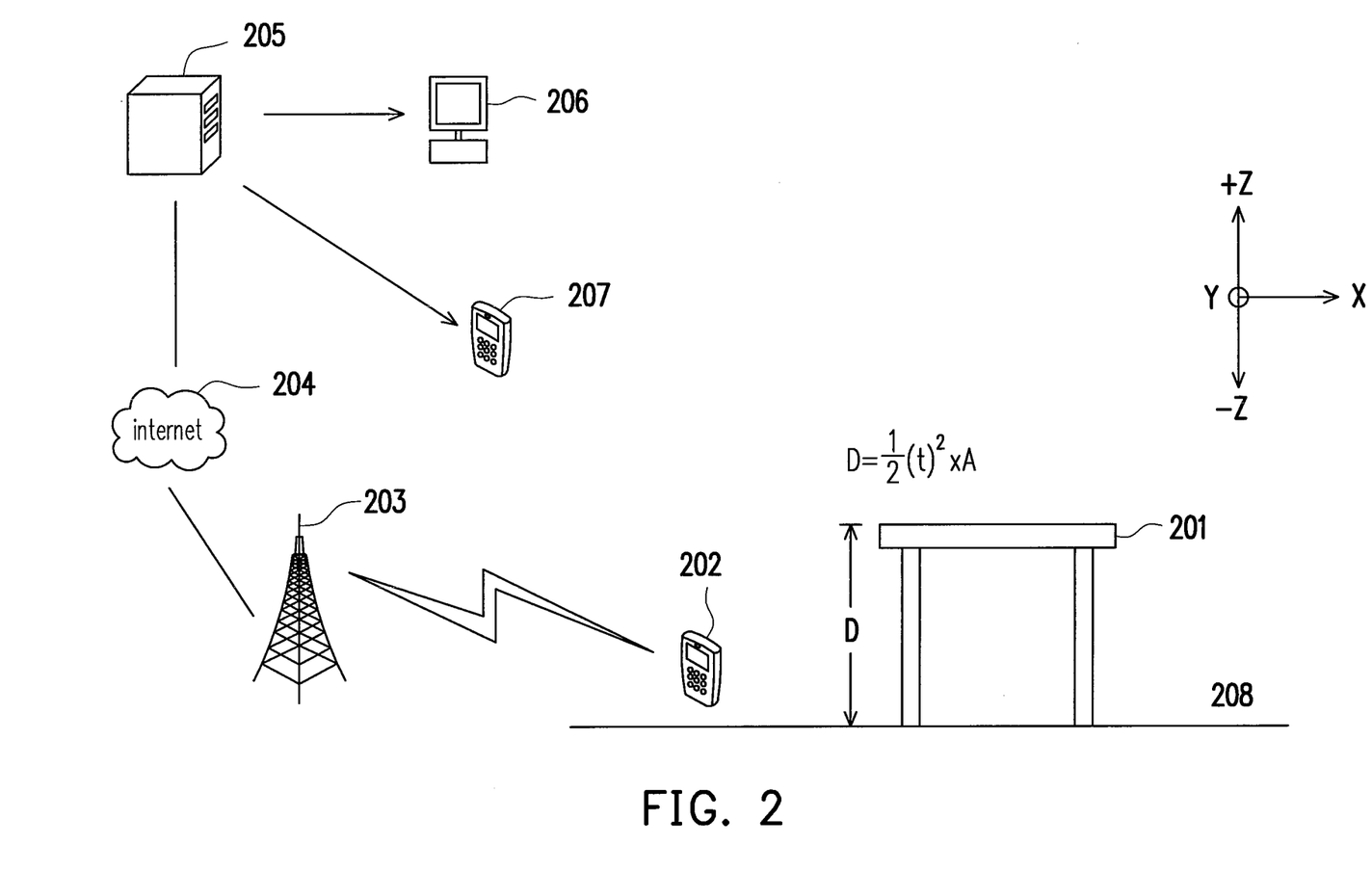
FIG. 2 illustrates a conceptual diagram of a fall event handling method in accordance with one of the exemplary embodiments of the present disclosure

FIG. 2 illustrates a conceptual diagram of a fall event handling method in accordance with one of the exemplary embodiments of the present disclosure. Suppose that the exemplary scenario has a mobile phone 202 falling down from a table 201. Once on board sensors are activated, the mobile phone 202 may detect the fall event's distance experienced by the mobile phone 202 using different sensors. The distance of the fall event could be characterized using at least a G-sensor, an altimeter, or a pressure sensor.

For example, the mobile phone 202 could use an onboard accelerometer such as a G-sensor to measure the vertical (Z-axis in FIG. 2) acceleration experienced by the mobile phone. The falling distance could be characterized according $d=(1/2) \times a \times (t)^2$ where d is distance, a is Z-axis component acceleration, and t is the time required to travel the distance d. The Z-axis component acceleration could be provided by the G-sensor. The time t could be known based on the time between samples and the number of samples containing values which deviate from the normal value of gravitational acceleration. Given all these parameters, the processor 101 would be able to calculate the total distance d between the table 201 and the floor 208.

Another way to calculate the falling distance d would be to utilize an onboard altimeter which measures the altitude of the mobile phone 202 based on the atmosphere pressure experienced by the mobile phone 202. The falling distance d could be calculated by the processor 101 based on the difference in height between the table 201 and the floor 208.

Another way to estimate the falling distance would be to use an on board pressure sensor. If would be assumed that the greater the distance the fall is, the higher pressure would be experience by the mobile phone 202. A predetermined pressure threshold could be empirically determined such that when the mobile phone 202 hits the floor 208, the processor 101 would determine whether the mobile phone 202 has traveled beyond a predetermined distance threshold based on the pressure measured by the pressure sensor when the mobile phone 202 hits the floor 208.

In conjunction with the measured falling distance of the mobile phone 202, the fall event of the mobile phone 202 could optionally be compared against an acceleration threshold which is near the free fall acceleration in order to confirm that the mobile phone is indeed falling from a height instead of being intentionally brought down toward a vertical distance, such as when a person brings a phone down the stairs or traveling down an elevator. The acceleration threshold could be set between 8.0~9.8 meters per second.

After the mobile phone 202 has traveled beyond a predetermined specific distance, the processor 101 could consider the fall event to have occurred. For example, the processor 101 could consider the fall event to have occurred if the specific distance is set for at least 40~50 cm. In one of the exemplary embodiments, the mobile phone 202 is meant to be carried by a patient or an elderly. If the mobile phone has traveled beyond 40~50 cm, then the patient or the elderly could be considered as someone who has fallen. In one of the exemplary embodiment, the mobile phone 202 is meant to be carried by an average person with fall detection function activated. In that case, the threshold could be set higher to be at least 0.5~0.75 meter.

After the processor 101 has considered the fall event of the mobile phone 202 to have indeed occurred, the processor 101 could optionally determine whether the fall event has stopped, or in other words, the mobile 202 phone either lies still on the floor or at least the fall event is no longer on going. This determination could be made based on whether the Z component of the acceleration detected by the G-sensor is zero and/or persists at zero for greater than a predetermine period or a predetermine number of samples of the output of the G-sensor.

After the processor 101 has optionally determined that the mobile phone 202 is no longer falling, the processor 101 would be configured to determine either someone has picked up the phone within a predetermined period. In the case where the mobile phone 202 is meant to be placed in a pocket or bag of a person such as a patient or elderly in order to perform fall detection upon them, the processor 101 would be considered to determine whether the fallen person has stood back up within a predetermined period, which could be set between 25~30 seconds. In both cases, the detection could be made using a G-sensor to measure the Z axis acceleration experienced by the mobile phone 202. If the G-sensor measures a positive Z axis acceleration beyond a certain threshold, then the mobile phone 202 is considered to be picked up or the person carrying the mobile 202 is considered to have gotten up. In the case when a pressure sensor is used to determine whether the mobile phone 202 is considered to be picked up or the person carrying the mobile 202 is considered to have stood up, a sensor variation could be considered. If the sensor reading exceeds a variation threshold, then the mobile phone 202 would be considered to picked up or the person carrying the mobile 202 is considered to have stood up. In another exemplary embodiment, an altimeter to be used to detect when the mobile 202 has experienced a change in height.

In the case when the mobile 202 is not considered to have been picked up or the person carrying the mobile 202 is not considered to have stood up, an alarm in the mobile phone 202 could be activated. The alarm could be a vibratory alarm, a sound alarm, or a visual alarm such as blinking or flashing LED light having a particular color. The mobile phone 202 may also transmit a notification to a base station 203 or a wifi access point. The notification may contain information such as the GPS coordinate of the mobile phone 202, the geographic coordinate of the mobile phone 202, the last check in point of the mobile 202, or a combination of the above. The notification could be a short message service (SMS) message, a multimedia message service (MMS), an email, an instance message, a private message to a contact of a social network website message, or a post to the social network website. The base station 203 or the wifi access point would then transmit the notification to the internet 204 and then to a cloud server 205. The server 205 could then deliver the notification to a predetermine list of contact such as receiving an email in one's personal computer 206 or sending an instant message to a contact.

In one of the exemplary embodiments, the server 205 may also dynamically determine at least one person who is an acquaintance of the user of the mobile phone 202. For instance, the server 205 may first determine the identity of the user of the mobile phone 202 and then determine the contacts of the user of the mobile phone 202. The server 205 may next determine whether there is any acquaintance of the user of the mobile phone 202 is nearby. The determination could be based on the last check in location of the contacts or the known address of the contacts or exact positioning of selected contacts based on their last known location. The server 205 could then page or send the notification to the acquaintance (e.g. 207) of the user of the mobile phone 202 nearby in order for the acquaintance to arrive on the location of the mobile 202 to assist the user lying on the ground or to pick up the mobile phone 202 which might have fallen out of one's possession unnoticed. In one of the exemplary embodiments, the mobile phone 202 may periodically (e.g. every 10 minutes) transmit a notification to inform the location of the mobile phone 202.

Figure 3A:
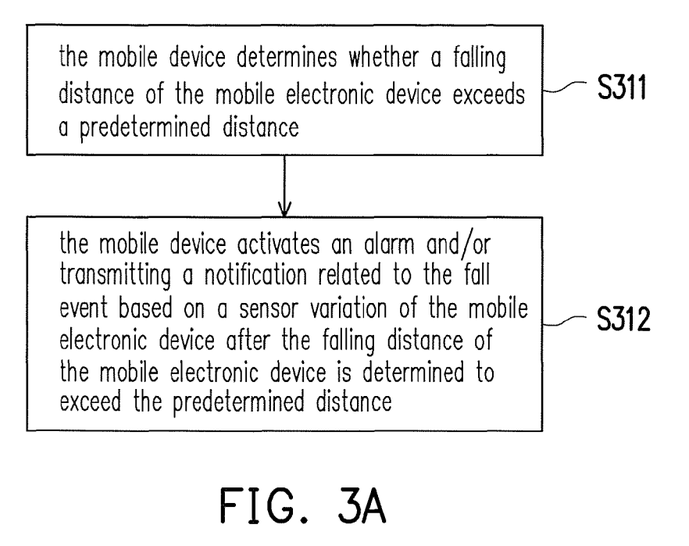
FIG. 3A is a flow chart which illustrates a fall event handling method in accordance with one of the exemplary embodiments of the present disclosure.

FIG. 3A is a flow chart which illustrates a fall event handling method for use by a handheld mobile electronic device in accordance with one of the exemplary embodiments of the present disclosure. In step S311, the mobile device determines whether a falling distance of the mobile electronic device exceeds a predetermined distance. In step S312, the mobile device activates an alarm and/or transmitting a notification related to the fall event based on a sensor variation of the mobile electronic device after the falling distance of the mobile electronic device is determined to exceed the predetermined distance.

Figure 3B:
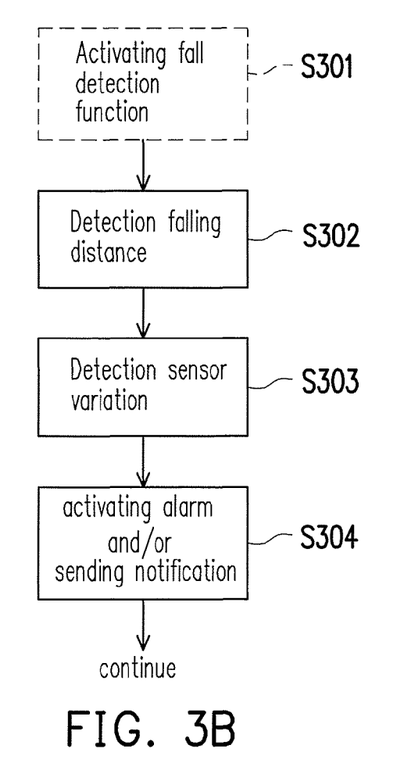
FIG. 3B is a flow chart which illustrates a fall event handling method in accordance with one of the exemplary embodiments of the present disclosure.

FIG. 3B is a flow chart which illustrates a fall event handling method for use by a handheld mobile electronic device in accordance with one of the exemplary embodiments of the present disclosure. In optional step S301, the fall detection function could be activated by the handheld mobile electronic device. Since the fall detection function would require activations of a plurality of sensors, a user may have options to activate or deactivate them manually in order to save power, or the activation or deactivation could be automatically tied to a specific event such as pushing the power button on or off. In one of the exemplary embodiments, a user may manually activate or deactivate one or a combination of a G-sensor, pressure sensor, or altimeter through a menu. In step S302, the handheld mobile electronic device could continuously perform falling detection based on the above mentioned techniques. In step S303, after the falling event detected by the handheld mobile electronic device, said device could start a timer counting for a specific period and determine whether an onboard sensor has exceeded a variation threshold within the specific period. If the count of the timer has exceeded the specific period without having the onboard sensor measuring a reading beyond the variation threshold, then the handheld mobile electronic device would be considered to be not picked up or the user of the handheld mobile electronic device would be considered to not have stood up.

Figure 4:
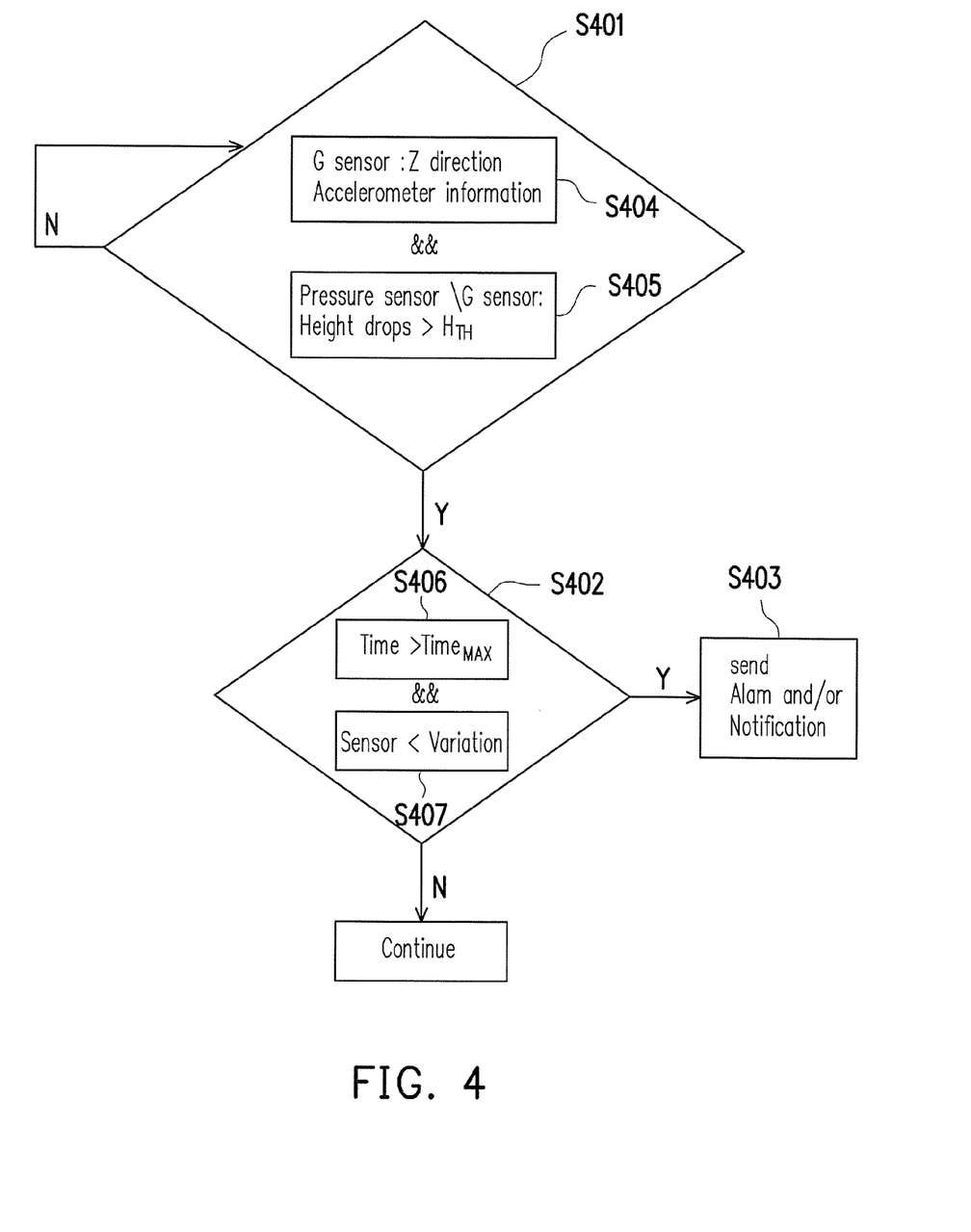
FIG. 4 is a flow chart which illustrates one specific embodiment of the fall event handling method.

FIGS. 4~7 serve to elucidate the method of FIG. 3 with various specific embodiments. FIG. 4 is a flow chart which illustrates one specific embodiment of the fall event handling method. In step S401, the processor 101 of a mobile electronic device would take sensor readings from one or more sensor within the sensor array 105 for the purpose of determining whether a fall event exceeding a specific distance has occurred. More specifically, in step S404, the processor 101 would take in the Z direction output from an onboard G sensor to determine whether the Z direction G. sensor reading has exceed an acceleration threshold. In step S405, one or a combination of an onboard pressure sensor or altimeter or G sensor could be depended upon by the processor 101 to determine the distance of the drop and whether the distance of the drop has exceeded a distance threshold. In one of the exemplary embodiments, when results from both step S404 and step S405 are affirmative, that is, when both the acceleration threshold and distance threshold are exceeded, then the processor 101 would consider the fall event to have occurred. In another one of the exemplary embodiments, only the condition in step S405 would need to be fulfilled in order for the processor 101 to consider that a genuine drop has occurred. When the processor 101 has considered that the fall event has occurred, steps S402 would proceed, otherwise the step S401 would be repeated.

In step S402, the processor 101 would determine whether the handheld mobile electronic device has been picked up or the user of the handheld mobile electronic device is no longer lying down on the floor. If the handheld mobile electronic device has not been picked up or the user of the handheld mobile electronic device is still lying down on the floor, then the process would move to step S403. More specifically, in step S406, when the processor 101 has determined that the fall event has indeed occurred, that is, when one or both conditions of step S404 and step S405 have been met, a timer would be activated to count for a predetermined period, $time_{Max}$. In step S407, the processor 101 would determine whether an on board pressure sensor has exceeded a variation threshold and/or whether an on board G-sensor has measured a positive Z-axis G-sensor reading beyond a threshold. If in step S407, said threshold(s) has been exceeded within the predetermined period $time_{Max}$, then S403 is not executed. The processor 101 would then interpret that the handheld mobile electronic device could have been picked up or a user having the handheld mobile electronic device in one's bag or pocket could have gotten up. At this point, the process may loop back to S401 or the processor may execute other functions other than what is described in FIG. 4. But if the sensor(s) variation of step S407 is less than predetermined variation threshold and the timer has counted beyond $time_{ax}$, then S403 would be executed. In step S403, the processor 101 would activate an alarm through the output interface 107. More concretely, the processor 101 would activate a vibrating oscillator, one or more flashing or blinking LED of one or more colors, or a ringing sound as warning for the user of the handheld mobile electronic device or other people at the scene. Also in step S403, the processor 101 may also deliver a notification to a nearby wifi access point or a base station to a contact list predetermined or dynamically determined to inform the recipient(s) of the notification of the falling event.

Figure 5:
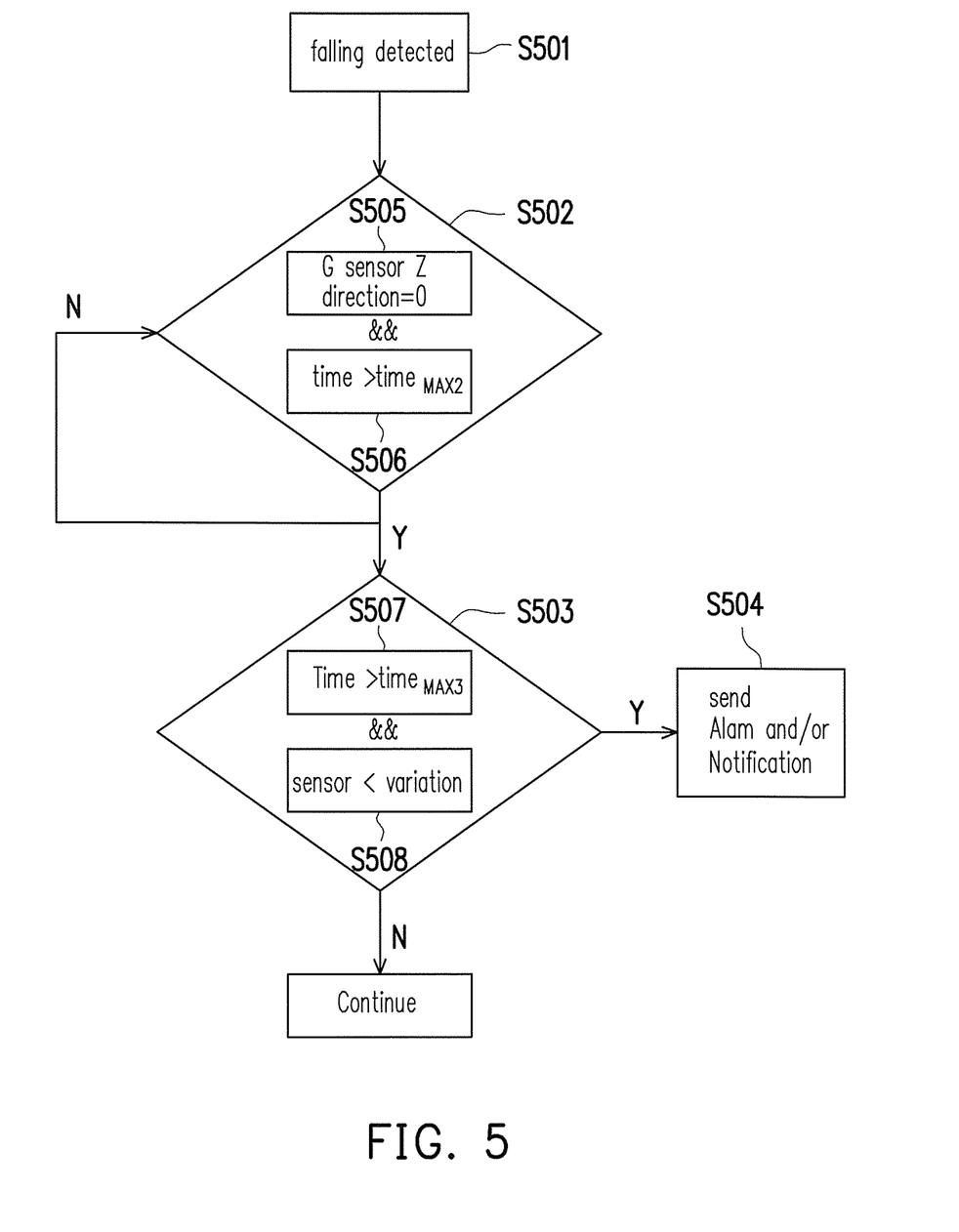
FIG. 5 is a flow chart which illustrates one specific embodiment of the fall event handling method.

FIG. 5 is a flow chart which illustrates one specific embodiment of the fall event handling method. In step S501, the processor 101 of a mobile electronic device would take sensor readings from one or more sensor within the sensor array 105 to detect whether a fall event exceeding a specific distance has occurred. The detection technique of step S501 would be the same as step S401 (e.g. steps S404 & S405) and the above mentioned technique described for FIG. 2, and therefore the same written description will not be repeated. In step S502, the processor 101 of a mobile phone would determine whether the fall event has ended. If not, the processor 101 would wait for the fall event to end; otherwise the process moves on to step S503. In step S503, the processor 101 would determine whether the handheld mobile electronic device has been picked up or displaced. If that has been so, then in step S504, the handheld mobile electronic device would activate a warning through the output interface 107 and/or delivery a notification message related to the falling event. Steps S502~S504 would be described in more detail.

In step S505, the processor 101 would determine the on board G-sensor would detect a vertical acceleration value. If the processor 101 has detected a negative Z-axis acceleration value, then the handheld mobile electronic device could still be falling. If the processor 101 has detected a positive Z-axis acceleration value, then the handheld mobile electronic device could actually be bouncing up after it hits a surface. If in steps S505 & S506 the vertical acceleration value detected by the G-sensor is zero for a predetermined duration $time_{MAX2}$ such as at least one second or for a predetermined number of samples, then the step S503 would proceed. Otherwise the process loops back to S502 as the processor 101 would wait for the falling event to stop. One of the advantages of having step S502 is that a buffer period is placed between steps S501 and step S503 so that when the handheld mobile electronic device hits a surface and produces readings in the G-sensor or pressure sensor, these sensor readings would not be interpreted by the processor 101 as the handheld mobile electronic device getting picked up or the person having the handheld mobile electronic device in one's bag or pocket getting up prematurely.

In step S508, the processor 101 would determine whether an on board pressure sensor has exceeded a variation threshold and/or whether an on board G-sensor has measured a positive Z-axis G-sensor reading beyond a threshold. In step S502, the processor 101 would activate an on board timer to measure for a time period $time_{Max}$ as soon as the conditions in steps S505 and S506 are fulfilled. If in step S503, said threshold(s) has been exceeded within the predetermined period $time_{Max3}$, then S504 would not be executed. But if the sensor(s) variation of step S508 is less than predetermined variation threshold and the timer has counted beyond $time_{Max3}$, then S504 would be executed. Step S504 would be the same as step S403 as the processor 101 would activate an alarm through the output interface 107 and/or transmit a notification related to the fall event through the wireless transceiver circuit 102.

Figure 6:
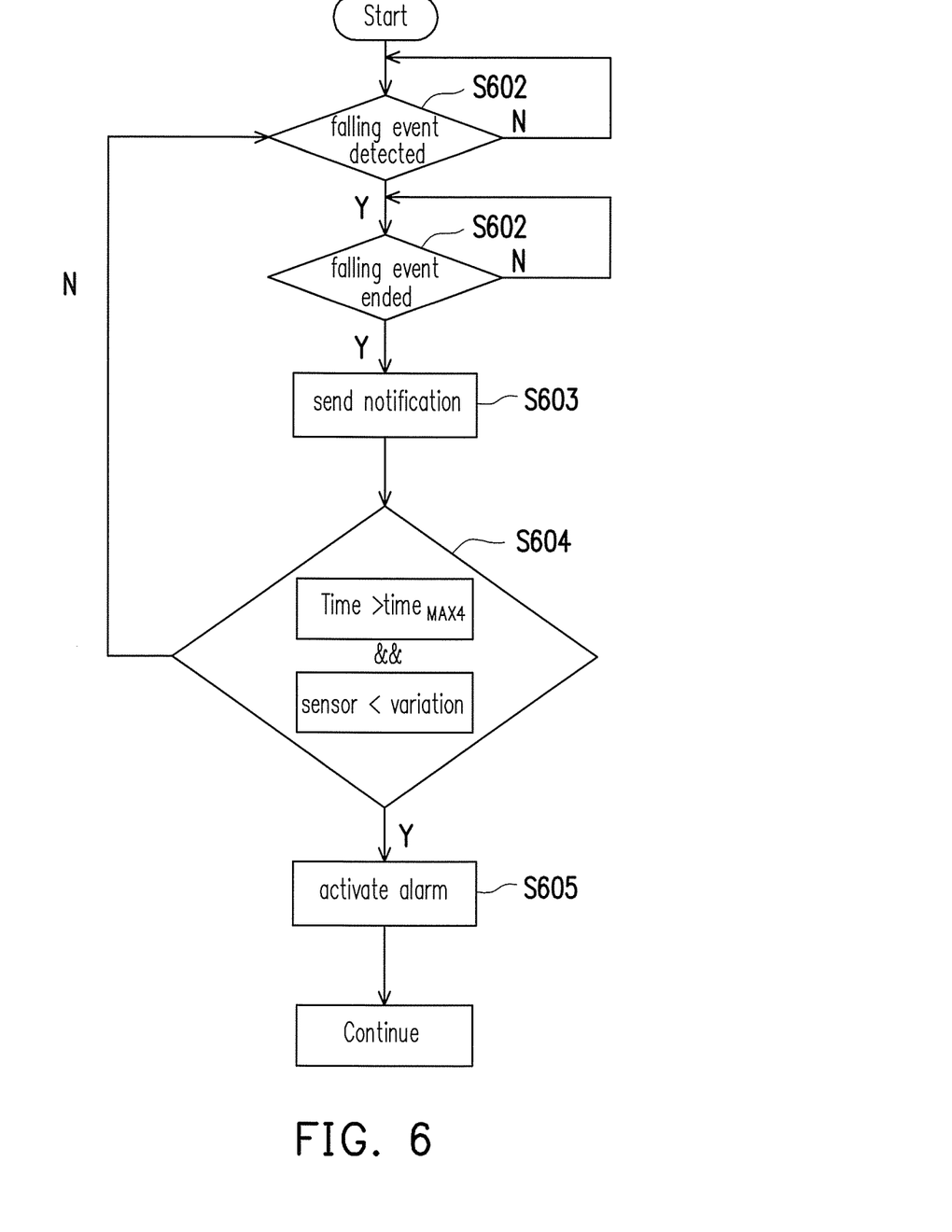
FIG. 6 is a flow chart which illustrates one specific embodiment of the fall event handling method.

FIG. 6 is a flow chart which illustrates one specific embodiment of the fall event handling method. The embodiment of FIG. 6 would be more specifically geared toward a fall event processing method configured to detect whether a person having the exemplary handheld mobile electronic device of FIG. 1 disposed in one's bag or pocket has fallen. In step S601, the processor 101 of a handheld mobile electronic device would take sensor readings to determining whether a fall event exceeding a specific distance has occurred. Since a person may place a handheld mobile electronic device in the pocket of one's trouser or pants, the specific distance could be measured from one's hip to the bottom of one's foot and could be set to be at least 30~40 centimeters. Step S601 would be the same as steps S401 and S501. In step S602, the processor 101 would determine whether the falling event has ended, and step S602 would be the same as step S502. In step S603, after the falling event has been determined by the processor 101 to have genuinely occurred, the processor 101 would send a notification related to the fall event through the wireless transceiver circuit 102 to a predetermined or dynamically determined contact list so that those who receive the notification may call or check on the user of the handheld mobile electronic device to see if everything is alright.

In step S604, the processor 101 would determine whether the handheld mobile electronic device has been picked up or the user of the handheld mobile electronic device is no longer lying down on the floor. The processor 101 would determine whether an on board pressure sensor has exceeded a variation threshold and/or whether an on board G-sensor has measured a positive Z-axis G-sensor reading beyond a threshold, and also in response to step S603 to have ended, the processor 101 would start a time to measure for a predetermined period $time_{Max4}$. If in step S604, said threshold(s) has been exceeded before the timer $time_{Max4}$ has been exceeded, then the process loops back to S601. In this case, the user of the handheld mobile electronic device would be considered to have gotten up and no alarm would be activated so that an unnecessary disturbance would not be created for pedestrians nearby. But if the sensor(s) variation of step S604 is less than predetermined variation threshold and the timer has counted beyond $time_{Max4}$, then in step S605, which is in part similar to steps S403 and S504, the processor 101 would activate an alarm through the output interface 107. At this point, a person would be considered to stay on the floor for more than $time_{max4}$ which could be between 25~30 seconds. By sounding the alarm, those who could be nearby may hear the alarm and attend to the fallen person.

Figure 7:
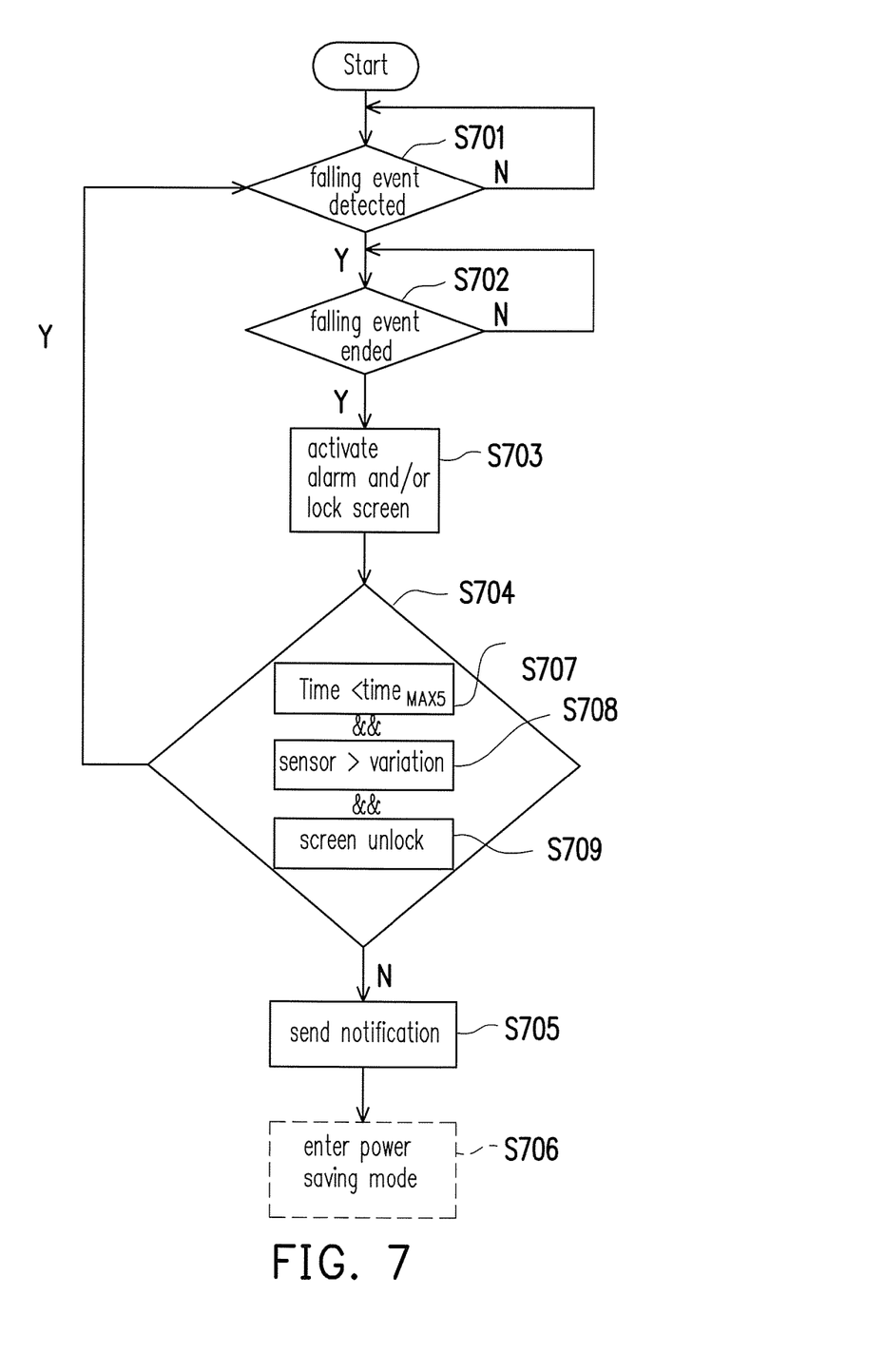
FIG. 7 is a flow chart which illustrates one specific embodiment of the fall event handling method.

FIG. 7 is a flow chart which illustrates one specific embodiment of the fall event handling method. The embodiment of FIG. 6 would be more specifically geared toward a fall event processing method configured to detect whether the exemplary handheld mobile electronic device of FIG. 1 has fallen out of one's bag or pocket or fallen off one surface to another surface undetected such as the scenario of FIG. 2. In step S701, the same as steps S401, S501, and S601, the processor 101 of a mobile electronic device would determine whether the fall event has indeed occurred. However, for this particular scenario, the distance threshold could be set higher to be at least between 50~75 centimeters which has to be exceeded before Step S702 would be executed. In step S702 which is the same as steps S502 and S602, the processor 101 of a mobile electronic device would determine whether the fall event has ended. In step S703, in response to the handheld mobile electronic device having been fallen, the processor 101 would activate an alarm to divert the attention of the user of the handheld mobile electronic device to the alarm so that the user would notice that the phone has fallen. The processor 101 may optionally activate a lock screen feature of the touch screen 103 to prevent unauthorized use just in case the handheld mobile electronic device was picked up by someone other than the user and to prevent inadvertent touching and dialing. After step S703 is executed, step S704 would proceed.

In steps S707 and S708, the processor 101 would determine whether the handheld mobile electronic device has been picked up such that it would be at least no longer lying down on the floor. In step S707, the processor would start a timer in the end of step S703 counting to time$_{Max5}$. In step S708, the processor 101 would determine whether an on board pressure sensor has exceeded a variation threshold and/or whether an on board G-sensor has measured a positive Z-axis G-sensor reading beyond a threshold. If in step S704, said threshold(s) has been exceeded within the predetermined period time$_{Max5}$, then the handheld mobile electronic device would be considered to have been picked up. At this point, the alarm would automatically stop. Also optionally in step S709, the user of the handheld mobile electronic device could be expected to enter a password to unlock the screen lock which was activated back in step S703. If the user has entered a correct password to unlock the screen lock, the user should be considered to be the rightful owner of the handheld mobile electronic device, and the process would loop back to step S701.

However, if the sensor(s) variation of step S704 is less than predetermined variation threshold and the timer has counted beyond time$_{Max5}$, and optionally when the screen lock has not been deactivated, then S705 would be executed. In step S705, the processor 101 may continue to activate an alarm through the output interface 107, or more concretely, the vibrating oscillator, one or more flashing or blinking LED of one or more colors, or a ringing sound would serve as warnings for the user of the handheld mobile electronic device or other people in the proximity. In step S705, the processor 101 may also deliver a notification to a nearby wifi access point or a base station to a contact list predetermined or dynamically determined to inform the recipient(s) of the notification of the falling event so that the recipient(s) may go to the site to pick up the phone which could still be lying on the floor. If the screen lock feature related to steps S703 and S709 would be required—it is a necessary condition for step S704 to move to step S705, and the phone has been determined to be picked up but the screen is not yet unlocked, then the processor 101 may consider that the handheld mobile electronic device has been picked up by someone other than the regular user of the handheld mobile electronic device. In this case, the processor 101 could be configured to delivery the notification related to the fall event on a regular basis such as every 10 minutes to update the location of the handheld mobile electronic device. In the optional step S706, the handheld mobile electronic device may enter a power saving mode to turn off any unnecessary functions.

Figure 8:
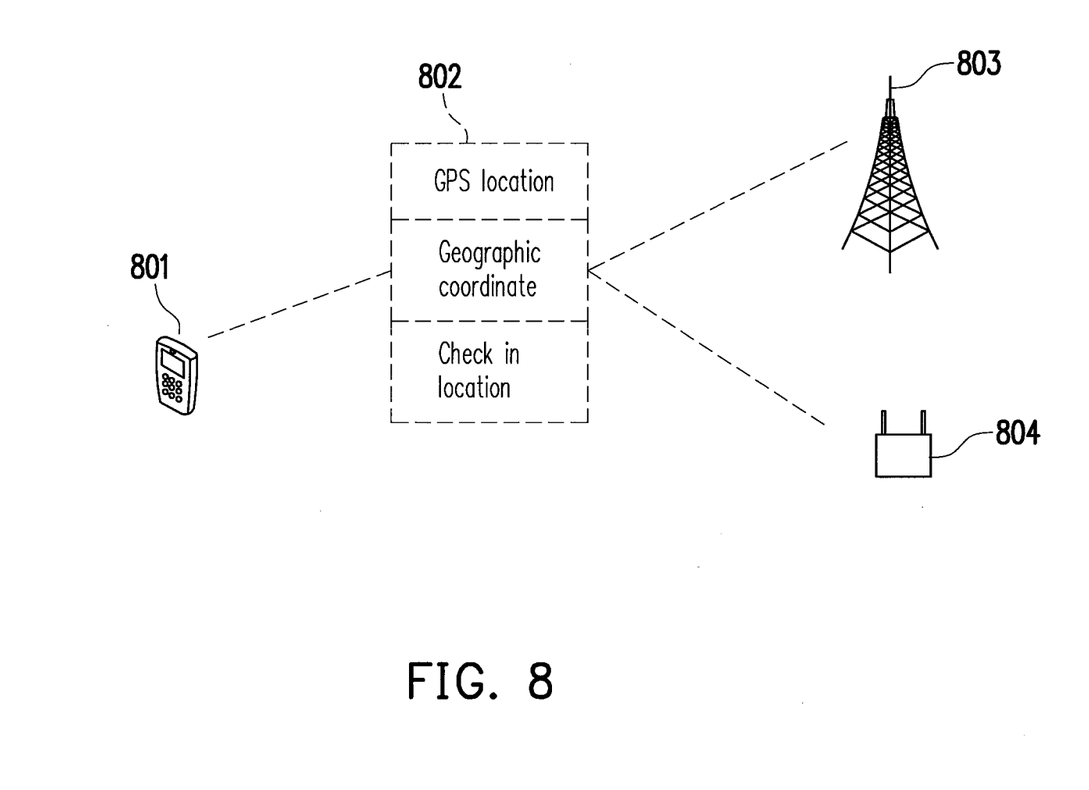
FIG. 8 illustrates the content of fall event notification in accordance with one of the exemplary embodiments of the present disclosure.

FIG. 8 illustrates the content of fall event notification in accordance with one of the exemplary embodiments of the present disclosure. A handheld mobile electronic device 801 in the exemplary scenario would send a notification 802 through the wireless transceiver circuit 102 to a wireless base station or a wife access point 804. The content of the notification may include the time and location when the falling event has occurred. The location information may include at least one or a combination of a GPS location, a geographic coordinate, and the last check-in location. The GPS location could be determined by a GPS position module (not shown in FIG. 1) before the notification is sent. The geographic coordinate could be estimated by the network using pilot or reference signals from base stations. The last check in location would be the last check in location using a social networking website such as Facebook. The notification 802 would assist the recipient(s) of the notification 802 to determine the time and the location when the fall event occurred as well as the updated location of the handheld mobile electronic device. The notification could be a short message service (SMS) message, a multimedia message service (MMS), an email, an instance message, a private message to a contact of a social network website message, or a post to the social network website.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

In view of the aforementioned descriptions, the present disclosure proposes a method of handling a fall event for use by a handheld mobile electronic device, and a handheld mobile electronic device using the same proposed method which allows a fall event to be detected, reported, and handled so that the handheld mobile electronic device falling out of a person's possession could be easily recovered, and also the handheld mobile electronic device would be able to detect whether one wearing the handheld mobile electronic device has fallen so that the fallen person would be noticed and attended to.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:
1. A method of handling a fall event of a mobile electronic device comprising:
 determining whether a falling distance of the mobile electronic device exceeds a predetermined distance;

detecting a sensor variation of the mobile electronic device within a predetermined time period after the falling distance of the mobile electronic device is determined to exceed the predetermined distance; and activating an alarm and/or transmitting a notification related to the fall event based on the detected sensor variation of the mobile electronic device.

2. The method of claim 1, wherein the step of activating the alarm based on the sensor variation further comprises:
determining whether the sensor variation of the mobile electronic device is greater than a non-zero predetermined variation threshold within a predetermined time period after the falling distance of the mobile electronic device is determined to exceed the predetermined distance; and
activating the alarm after the sensor variation of the mobile electronic device is determined to be not greater than the non-zero predetermined variation threshold within the predetermined time period.

3. The method of claim 2, wherein the step of determining whether the sensor variation of the mobile electronic device is greater than the non-zero predetermined variation threshold within the predetermined time period after the falling distance of the mobile electronic device is determined to exceed the predetermined distance further comprises:
determining whether the sensor variation of the mobile electronic device is greater than the non-zero predetermined variation threshold within the predetermined time period after a Z-component movement of the mobile electronic device is determined to exceed a speed threshold.

4. The method of claim 2, wherein the step of determining whether the sensor variation of the mobile electronic device exceeds the non-zero predetermined variation threshold within the predetermined time period after the falling distance of the mobile electronic device is determined to exceed the predetermined distance further comprises:
determining whether the sensor variation of the mobile electronic device is greater that the non-zero predetermined variation threshold within the predetermined time period when the fall event has ceased.

5. The method of claim 4, wherein the fall event has ceased when the Z-component movement of the handheld mobile electronic device is zero after the mobile electronic device has fallen beyond the specific distance.

6. The method of claim 2, wherein the predetermined time period is between 25~30 seconds.

7. The method of claim 1, wherein the sensor variation of the mobile electronic device comprises at least one of a pressure sensor variation of the mobile electronic device and an acceleration sensor variation of the mobile electronic device.

8. The method of claim 1, wherein the alarm comprises at least one of a sound alarm, a vibration alarm, and a visual alarm of the mobile electronic device.

9. The method of claim 1, wherein the notification related to the fall event comprises at least one of an email notification, an instant message notification, a short message service (SMS) message, a multimedia message service (MMS) message, and a paging message related to the fall event.

10. The method of claim 1, wherein the falling distance is measured by using one of an accelerometer, a pressure sensor and an altimeter.

11. A handheld mobile electronic device comprising:
a sensor array or hub comprising a sensor;
a transmitter for transmitting data; and
a processor coupled to the sensor array or hub and the wireless transmitter and is configured for:
determining whether a falling distance of the mobile electronic device exceeds a predetermined distance through the sensor;
detecting a sensor variation of the mobile electronic device within a predetermined time period after the falling distance of the mobile electronic device is determined to exceed the predetermined distance; and
activating an alarm and/or transmitting a notification related to the fall event through the transmitter based on the detected sensor variation of the sensor.

12. The device of claim 11, wherein the processor is configured for activating the alarm based on the sensor variation further comprises:
determining whether the sensor variation of the mobile electronic device is greater than a non-zero predetermined variation threshold within a predetermined time period after the falling distance of the mobile electronic device is determined to exceed the predetermined distance; and
activating the alarm after the sensor variation of the mobile electronic device is determined to be not greater than the non-zero predetermined variation threshold within the predetermined time period.

13. The device of claim 12, wherein the processor is configured for determining whether the sensor variation of the mobile electronic device is greater than the non-zero predetermined variation threshold within the predetermined time period after the falling distance of the mobile electronic device is determined to exceed the predetermined distance further comprises:
determining whether the sensor variation of the mobile electronic device is greater than the non-zero predetermined variation threshold within the predetermined time period after a Z-component movement of the mobile electronic device is determined to exceed a speed threshold.

14. The device of claim 12, wherein the processor is configured for determining whether the sensor variation of the mobile electronic device exceeds the non-zero predetermined variation threshold within the predetermined time period after the falling distance of the mobile electronic device is detelined to exceed the predetermined distance further comprises:
determining whether the sensor variation of the mobile electronic device is greater that the non-zero predetermined variation threshold within the predetermined time period when the fall event has ceased.

15. The device of claim 14, wherein the fall event is determined by the processor to have ceased when the Z-component movement of the handheld mobile electronic device is zero after the mobile electronic device has fallen beyond the specific distance which is at.

16. The device of claim 12, wherein the predetermined time period is between 25~30 seconds.

17. The device of claim 11, wherein the sensor variation of the mobile electronic device comprises at least one of a pressure sensor variation of the mobile electronic device and an acceleration sensor variation of the mobile electronic device.

18. The device of claim 11, wherein the alarm comprises at least one of a sound alarm, a vibration alarm, and a visual alarm of the mobile electronic device.

19. The device of claim 11, wherein the notification related to the fall event comprises at least one of an email notification, an instant message notification, a short message service (SMS) message, a multimedia message service (MMS) message, and a paging message related to the fall event.

20. The device of claim 11, wherein the falling distance is measured by using one of an accelerometer, a pressure sensor and an altimeter.

* * * * *